United States Patent [19]

Perry et al.

[11] 4,275,036

[45] Jun. 23, 1981

[54] RENDERING SYSTEMS

[76] Inventors: Richard R. Perry, 1113 Balthis Dr., Gastonia, N.C. 28052; Anthony G. Maran, 25698 Yeoman Dr., Westlake, Ohio 44145; Anton G. Schols, T. H. Haismastr. 4, 9251 Av Bergum, Netherlands

[21] Appl. No.: 160,658

[22] Filed: Jun. 18, 1980

Related U.S. Application Data

[62] Division of Ser. No. 82,015, Oct. 5, 1979.

[51] Int. Cl.[3] .......................... B01D 1/22; B01D 17/02

[52] U.S. Cl. .................................... 422/286; 210/251; 422/288; 422/290; 422/308; 422/309

[58] Field of Search ............... 422/284, 285, 286, 288, 422/289, 290, 307, 308, 309; 154/DIG. 10, DIG. 16; 99/352, 355; 210/251

[56] References Cited

U.S. PATENT DOCUMENTS

| | | | |
|---|---|---|---|
| 1,930,091 | 10/1933 | Halyorson et al. | 210/255 X |
| 2,673,790 | 3/1954 | Illsley | 422/269 |
| 3,230,054 | 1/1966 | Ling | 422/309 X |
| 3,288,825 | 11/1966 | Keith | 422/286 |
| 3,471,534 | 10/1969 | Jones | 422/287 X |
| 3,487,094 | 12/1969 | Trautman et al. | 422/287 |
| 3,506,407 | 4/1970 | Keith | 422/287 |
| 3,529,939 | 9/1970 | Mason | 422/273 |
| 3,632,615 | 1/1972 | Mason | 422/285 X |
| 3,673,227 | 6/1972 | Keith | 422/287 |
| 3,682,091 | 8/1972 | Bredeson | 422/226 X |
| 3,782,902 | 1/1974 | Madsen et al. | 422/287 |
| 3,898,134 | 8/1975 | Greenfield et al. | 203/47 |
| 3,899,301 | 8/1975 | Bredeson et al. | 422/255 |
| 3,917,508 | 11/1975 | Greenfield et al. | 159/47 R |
| 3,950,230 | 4/1976 | Greenfield et al. | 203/47 |
| 4,007,094 | 2/1977 | Greenfield et al. | 203/10 |

*Primary Examiner*—William A. Cuchlinski, Jr.
*Attorney, Agent, or Firm*—Squire, Sanders & Dempsey

[57] ABSTRACT

An improved rendering process and system including the use of both a slurry evaporator and cooker. Renderable material is ground and mixed with oil to form a slurry which is then cooked under vacuum in an evaporator to remove some moisture. The resulting partially dewatered slurry is partially deoiled, and the solids residue resulting from deoiling is cooked in a cooker to remove additional moisture. The hot vapors generated by cooking the material in the cooker are used in the steam jacket of the evaporator. Preferably the dewatered solids residue from the cooker is further deoiled.

16 Claims, 5 Drawing Figures

RENDERING SYSTEMS

This application is a division, of application Ser. No. 082,015, filed Oct. 5, 1979.

BACKGROUND OF THE INVENTION

This invention relates to an improved process for rendering and drying of materials belonging to a class of organic materials characterized by containing high moisture and high oil or fat levels. Such materials include those of animal origin, such as the flesh, fat, bones, offal (viscera), and blood of fish, poultry, beef and other livestock animals, including those portions of the animals obtained as by-products during the preparation of the animals for use as fresh meat as well as whole animals when they are not used as fresh meat. Such materials also include those of vegetable origin, such as coconut meats, bananas, avocado fruit and other vegetable materials characterized by containing high moisture level and high fat or oil levels, and which are typically rendered to remove moisture in order to obtain the fat or oil.

Some processes for converting renderable materials into usable by-products have been practiced for hundreds of years. At the turn of the century the primary rendering process was "wet rendering." Essentially, wet rendering consists of feeding the renderable material, especially waste animal products, into an agitated tank. Water is added at a ratio of about two parts water to one part renderable material, and then the tank is heated. Sometimes the water is added in the form of live steam, which also serves to agitate the material. As the mixture boils, the oil (also called fat, grease or tallow) melts and floats to the top where it is skimmed off. The water is drained off and the solid residue (often called tankage) is dried for use as animal feed and fertilizer.

In the early part of the twentieth century, the "dry rendering" process was developed. The dry rendering process takes its name from the fact that additional water is not added to the renderable material. Typically, a dry rendering process uses a closed, agitated, jacketed vessel (often referred to as a cooker), which is generally heated indirectly with steam fed through the jacket, U.S. Pat. Nos. 3,682,091 (Bredeson) and 2,673,790 (Illsley) disclose typical cookers. Such a process using a cooker is referred to herein as a "cooker dry rendering" process. The renderable material is placed in the cooker and cooked at about atmospheric pressure until the material is dry. Sometimes at least a portion of the cooking is done under pressure in order to raise the water's boiling point and thereby allow for sterilization of the material by cooking at a high temperature. After cooking is completed, the melted fat is drained away and the dry material discharged. Often the dry, drained solid discharge is fed to a press where additional oil is removed.

The cooker dry rendering process was first developed as a batch process. A charge of material was put into the cooker, then completely cooked and then removed. The process was then repeated with a new charge or batch.

The cooker dry rendering process was improved by the development of various continuous methods. U.S. Pat. Nos. 3,899,301 (Bredeson), 3,673,227 (Keith), 3,506,407 (Keith), 3,471,534 (Jones), and 3,288,825 (Keith) illustrate such continuous cooker dry rendering methods. Such continuous methods usually involve the use of breakers or grinders to reduce the renderable material to pieces of a more manageable and somewhat uniform size. Such pretreatment sometimes also includes an amount of heating. Such continuous methods are characterized by the continuous feeding of the pretreated renderable material into one end of the cooker and its removal from the other end, with its residency time in the cooker being enough to dry the material.

A relatively recently developed dry rendering process can be described as the "slurry evaporation" process. This process generally involves forming a thick, viscous slurry. This slurry is made by reducing the particle size of the renderable material by grinding or the like and mixing the renderable material with a fluid medium, which is preferably oil or fat previously separated from earlier processed renderble material. The slurry is then pumped to a vet still or evaporator where the slurry is heated under subatmospheric pressures to remove the moisture from the slurry. Thereafter, the oil is separated from the solids left in the dewatered slurry, such as by presses or the like. Slurry evaporation may be carried out as either a batch or a continuous process. U.S. Pat. Nos. 4,007,094 (Greenfield et al.). 3,950,230 (Greenfield et al.), 3,917,508 (Greenfield et al.), 3,782,902 (Madsen et al), and 3,529,939 (Mason) are illustrative of some of the slurry evaporation art.

In the slurry evaporation process there are several reasons for adding oil to the renderable material before it is sent to the evaporator. The additional oil makes it easier to grind the raw material. The additional oil helps to make the raw material fluid enough to be handled py pumping. In addition, it has been recognized that additional oil can form a film on the interior surfaces of the evaporator, which serves to improve operation of the evaporator, as is described in U.S. Pat. Nos. 3,898,134 (Greenfield et al.) and 3,529,939 (Mason).

Problems related to control of cooking conditions arise in all rendering processes. The oil or fat deteriorates upon exposure to higher temperatures, especially during long periods of time, thereby resulting in a poor oil product. Therefore, it is desirable to reduce the temperature to which the oil is exposed and to reduce the time the oil is exposed to high temperature. When renderable material is unsufficiently cooked, it is too moist and is difficult to press. But when renderable material is overly cooked, it tends to fall apart and produce fine pieces of solid material, called fines, which are difficult to remove from the oil. Therefore, it is desirable to prevent both over- and under-cooking. Since cooking time varies with, among other things, particle size, moisture content, and oil content, is is easier to control cooking conditions when these variables are controlled and fairly uniform.

One reason that the continuous cooker dry rendering process is an improvement over the batch process is that it provides a continuous discharge of rendered material from the cooker. This discharge may be sampled in order to monitor the temperature, consistency, and other characteristics of the cooked material. This information can be used to adjust the material input, cooking temperature, and other variables of the cooker.

Foaming and boil over is another concern in rendering processes. Essentially, foaming can be described as the formation of an excess of steam-filled bubbles as renderable material is heated. Foaming can interfere with the proper functioning of the rendering apparatus. The lower the pressure, the more likely foaming is to occur, and so vacuum operations are rather susceptible to foaming. Since foaming is a function of, among other things, moisture content, variations in the moisture content of the rendering material make foaming harder to control.

One of the reasons that the slurry evaporator process is an improvement over dry rendering is that evaporators are generally fitted with entrainment separators, carryover chambers, or the like which are of sufficient volume to contain a certain amount of foaming. Since foaming is thereby better controlled, the renderable material may be heated at rather high vacuums.

Another advantage of slurry evaporation processes over the processes which preceded it (such as wet rendering and cooker dry rendering) is the ability to increase energy efficiency by steam savings through what is called multistage or multiple effect evaporators. A simple example illustrates the advantages of a multiple effect evaporator. Consider a rendering system with two evaporators. The renderable material is first sent through evaporator A and then evaporator B. A steam source such as a boiler supplies the heat source for evaporator B. However, the heat source for evaporator A is not a separate boiler, but evaporator B. The hot vapors generated from the renderable material in evaporator B are used to heat the renderable material in evaporator A. Evaporators A and B can be referred to as the first and second stages, respectively, when one is speaking of the flow of renderable materials. Evaporators A and B can be referred to as the second and first effects, respectively, when one is speaking of the flow of steam. It should be noted that the flow of steam is opposite the flow of renderable material, and so, while there are the same number of stages and effects, the numbering of stages and effects start from opposite ends of the system.

Theoretically, steam requirements would be cut in half by such an arrangement of evaporators A and B. Several stages may be used. For example, a three stage system would ideally require only one-third the steam, a four stage system only one-fourth the steam, and so on. However, the temperature of the slurry must be raised in going from one stage to next, and the heat so used (often referred to as sensible heat) is not available to evaporate the water in the slurry. In addition, there are various inefficiencies and losses, such as transmission losses and radiation from the equipment, which further reduce the relative overall improvement in heat requirements. U.S. Pat. No. 4,007,094 (Greenfield) is an example of a multistage system.

In order for multistaging to work, the earlier the effect (later the stage) of the evaporator the higher its operating temperature must be. This is dictated by, among other things, the laws of thermodynamics which state that heat transfer occurs from a higher temperature body to a body of lower temperature, and so the steam must be hotter than the slurry it heats. In addition, the slurry is heated to a temperature above that of the boiling point of the water in it (this difference is sometimes referred to as boiling point rise), and this additional heat serves to help break the attraction between the water and slurry so that the water can be freed. Typically, a temperature difference between stages on the order of 30° to 120° F. is used in efficient slurry evaporation systems. The necessary temperature differences are accomplished in multistage evaporation systems by operating each later effect (earlier stage) at a lower pressure (higher vacuum) then the next earlier effect (later stage).

Similar exploitation of multistage use of steam is difficult in systems using cookers, rather than slurry evaporators. Cookers are often operated at a slight vacuum in order to provide a pressure differential to draw the vapors out of the vessel. Cookers used in batch processes are sometimes evacuated at the end of the batch in order to remove the vapors from the vessel. However, foaming problems make typical cookers ill-suited for continuous operation at low pressures (high vacuums). Therefore, typical cookers are not adaptable to the use of vacuum operation to obtain the required temperature differentials between stages, as in slurry evaporation systems. Theoretically, the necessary temperature differentials could be obtained by operating the later stages at high pressures. But this last alternative is unattractive because of the problems, such as cost, inherent in adapting a series of cookers to high pressure operation. This is particularly unattractive where one wishes to retrofit an existing facility already equipped with cookers not adapted to high pressure operation.

Although slurry evaporation processes have several advantages over cooker dry rendering processes, cookers have not been entirely displaced by slurry evaporators. Slurry evaporation systems are more expensive to build than systems using cookers. Thus, the better energy economy of slurry evaporators may be offset by higher capital investment.

There are also some materials which are more efficiently handled by cookers than slurry evaporators. In all slurry evaporation processes the renderable material must be ground into rather small particles. The handling of bones and other hard materials in a slurry evaporation system has a high energy cost, generally in electricity used to operate grinding machinery. In addition, there are materials, such as hair, feathers, rawhide, and the like, which are troublesome to render in an evaporator because they tend to clog up tubes in the evaporators. Furthermore, slurry evaporation processes typically operate by recirculating the slurry. This results in the recirculation of fines and sludge, thereby presenting oil quality control difficulties.

U.S. Pat. No. 3,632,615 (Mason) discloses cookers and a slurry evaporator used together in a single process. However, the combined use of both the slurry evaporation and dry rendering processes suggested therein presents some difficulties. For example, there is no attempt to reuse hot vapors generated during cooking. This wastes available heat. Furthermore, when an evaporator is used, oil is not pressed from dewatered material until after the material has gone through both the cookers and evaporator, and there is even provision for recycling some oil from the slurry evaporator to the cookers. This compromises oil product quality by promoting a high residency time for the oil and the recycling of fines. In addition, to the extent that the material in the cookers is kept in a liquid state, the surface area of the cooking material is less than that available in an agitated, semi-solid or solid state, as is typical of most cooker operations. This impedes one of the functions of agitation, which is to help to release vaporized moisture from the material being cooked. Other problems with the process disclosed in U.S. Pat. No. 3,632,315 and other prior art will become apparent to one of skill in the art upon study of the improvements made by our invention.

SUMMARY OF THE INVENTION

A general obejct of this invention is to provide an improved system and method for rendering organic materials.

It is an object of the present invention to provide a means for regulating the particle size, moisture, and oil level of feed of renderable material to a cooker in a rendering system, so as to permit more uniform cooking of each particle.

It is a further object of the present invention to provide a method for operating a cooker in a rendering system under vacuum without experiencing problems with foaming and boil over.

Another object of the present invention is to provide for slurry evaporation in a rendering system with a reduced oil residence time.

Still another object of the present invention is to provide for a slurry operation with less tendency for the recycling of accumulating fines within the slurry.

Yet a further object of the present invention is to afford a means for rendering in a more efficient and economical manner than presently attained in conventional rendering systems.

Another, more specific object is to provide improved flexibility in the choice between energy economy and capital investment in rendering systems.

Another object of the present invention is to provide a method to convert renderable materials into usable products by an improved process permitting retrofitting of existing rendering plants having cookers.

Still another object of the present invention is to provide for a method of reducing energy consumption during the grinding portion of a rendering process.

Another object of the present invention is to provide a method for rendering in a cooker that portion of the renderable material which is hard to grind or troublesome to render in an evaporator, while the balance of the renderable material is rendered in both an evaporator and cooker.

Another object is to provide a method for reusing some of the heat generated in cooking renderable materials in cookers.

Yet a further object of the present invention is to provide a semi-continuous process when used in conjunction with batch cookers, and a continuous operation when used with continuous cookers.

These and other objects will be apparent to those skilled in the art from the description to follow and from the appended claims.

The foregoing objects are achieved by our invention which makes advantageous use of both a slurry evaporator and a cooker in a rendering process combining techniques of slurry evaporation and cooker dry rendering with additional techniques. Renderable material is ground and mixed with oil to form a slurry. Preferably, renderable material whch is expensive to grind or troublesome to render in an evaporator is separated from the other renderable material before fine grinding to make the slurry. The slurry is cooked under vacuum in an evaporator to remove some of the moisture. The resulting partially dewatered slurry is partially deoiled, and the solid residue resulting from that deoiling is cooked in a cooker to remove additional moisture. Preferably, most of the remaining oil is then removed from the resulting dry solids residue. The hot vapors generated by the cooker are used to heat the slurry in the evaporator. Additional renderable material which is not readily suited to slurry evaporation and which was separated from the raw material before the slurry making step, may be cooked in the cookers along with the solids residue left from the slurry.

DESCRIPTION OF THE PREFERRED EMBODIMENTS

This invention relates to the rendering of organic material. The raw material fed into a rendering system according to the invention may be characterized as containing solids, fat, and water. Although the raw material may contain matter which would not otherwise be classified as solid, fat, or water, it is typical in the art to refer to the raw renderable material as containing only solids, fat, and water, and, for the sake of simplicity of description, that convention is used in this description. In addition, it should be understood that the words oil, fat, grease, and tallow are generally used interchangeably in this description when referring to matter removed from the renderable material.

Figure 1:
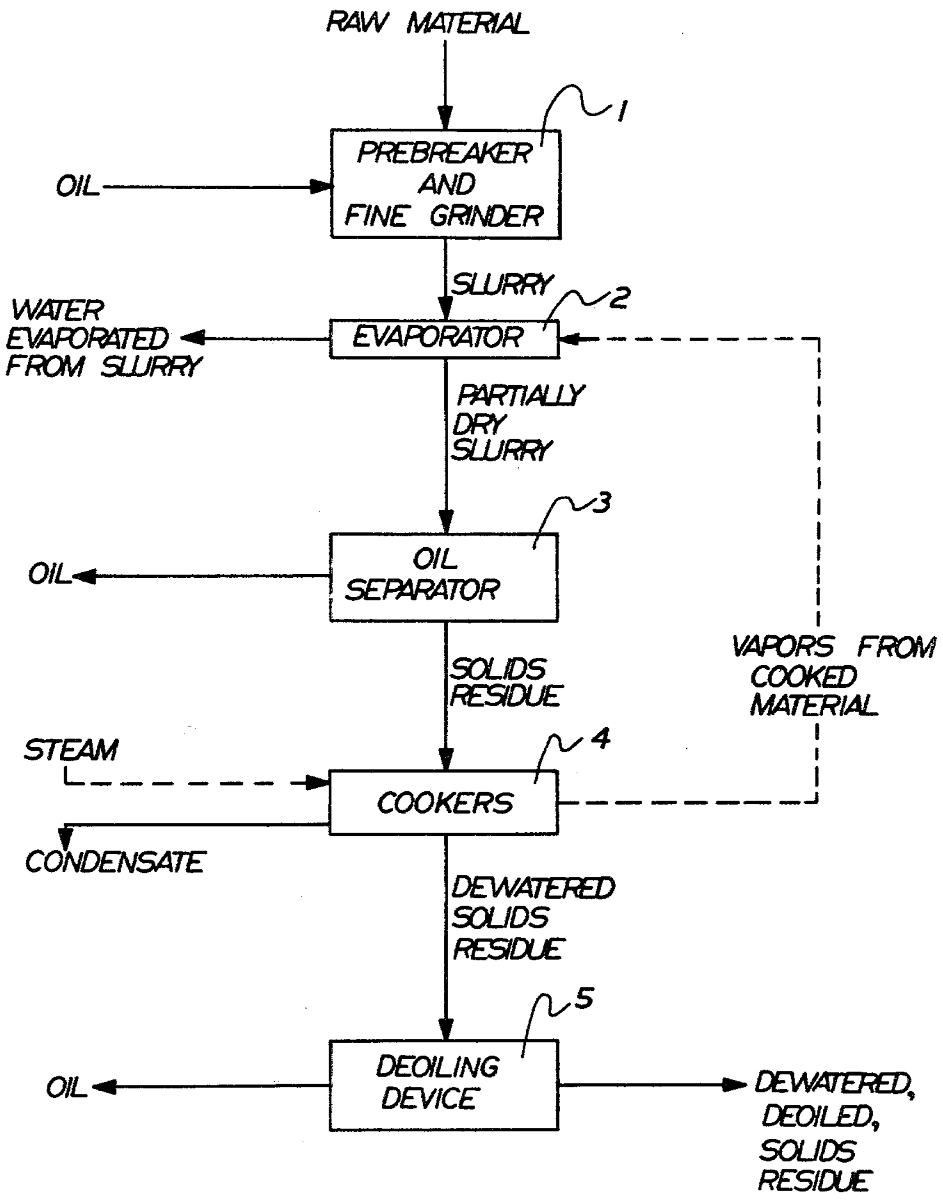
FIG. 1 is a schematic drawing illustrating the steps of a rendering process according to the invention.

FIG. 1 is a schematic illustrating a rendering process according to the invention. The raw renderable material is passed through a prebreaker and fine grinder 1. The prebreaker is used to prebreak the raw material to a particle size of approximately 1½ to 2 inches (measuring the largest diameter). The raw material is fluidized by mixing in fat or oil (or other liquid carrying agent with a boiling point above that of water). The fine grinder disintegrates the material to a particle size of about ⅛ to ½ inch. This prebreaking, fluidizing, and disintegrating forms the raw material and added oil into a slurry which is readily pumpable. At least enough oil is added to make the slurry sufficiently fluid to allow it to be pumped, although additional oil may be used, such as to ease grinding of the raw material.

If the raw material contains material which is troublesome to render in an evaporator (such as hair, feathers, rawhide, and the like) or which is expensive to grind (such as bones and other hard materials), these materials are preferably separated before making the slurry and handled separately. Optionally, these separated materials are added back into the process after the slurry is partially dewatered and deoiled, as described below.

The slurry is fed continuously to a single effect evaporator 2 which is operating at a vacuum of approximately 20 to 30 inches of mercury. The evaporator may be falling film single pass, falling film recirculating, forced circulation, or other types. Optionally, the evaporator may be a multiple effect evaporator, that is, it may be a series of staged evaporators. If a single stage evaporator is used, it is preferably one designed to heat the renderable material in the tube section sufficiently to vaporize about one-half of the contained water under high vacuum, and then allow the water vapors to escape from the renderable material in the confines of a vapor chamber designed to counteract the tendency for foaming and boil over. The resulting water vapors are collected and condensed, except where multiple effect evaporation is used, in which case all the vapors are reused, except those from the last effect (first stage).

The partially dried material, still in the form of a slurry, is then removed from the evaporator 2 by means of a pump, or other suitble method, and fed to an oil-solids separating device 3 where the free oil is removed. This device may be a centrifuge or a separating screen. A screen reduces the amount of fines and sludge recycled with the oil, as well as reduces the equipment cost as compared to a centrifuge, but does not remove as much oil as a centrifuge. Alternatively, the free oil may simply be decanted from the solids. Preferably, the separating device 3 removes as much oil as possible. Since freely drainable oil is easily removed, at least that amount of oil should be removed. Preferably, some or all of the removed oil is recycled for use in the previous slurry making step. Generally, about as much oil is removed by separating device 3 as is added in the slurry making step. However, some raw materials, such as chicken offal, contain so little natural oil that the separating device 3 does not even remove the amount of oil added in the slurry making step. Also, less efficient oil removing devices may remove lesser amounts at this step. Very efficient oil removing devices may remove greater amounts.

The partially dried material, now partially defatted, is no longer a slurry, and it has an essentially uniform particle size, moisture and fat level. This solids residue which is hydrous (i.e., it still has come water yet to be removed) but with a lower water content than the raw material is transported to cookers 4 where, preferably, substantially all of the balance of the moisture is removed so as to obtain a dewatered solids residue with a moisture content in the range of about 2-6% as measured on a fat free basis (that is, the ratio of water to solids is about 2-6%). Where material which is expensive to grind or troublesome to render in an evaporator was separated prior to making the slurry, one has the option of adding this separated material into the cookers 4 to be rendered with the residue from deoiling device 3.

The dewatered residue from the cooker is sent to another deoiling device 5. Preferably, this deoiling is done by mechanical pressing with either direct full pressing or prepressing followed by full pressing. Some of the oil may be recycled to the slurry making step. The deoiling may also be done by solvent extraction. The remaining oil is cleaned and dried by conventional methods to produce the final oil product. The final solids product consists of the dewatered, deoiled solids residue resulting from the final deoiling in device 5. Preferably, substantially all the remaining oil is removed by device 5; however, there remains some residual oil in the resulting dewatered, deoiled solids residue. The amount of this residual oil varies, and it depends principally on the nature of the raw material and the efficiency of device 5. With a fairly efficient device 5 the final solids product comprises about 7% to 13% by weight of oil.

The cookers 4 are generally horizontal cylindrical vessels containing an internal paddle agitator-conveyor and usually, but not necessarily, an external steam jacket. They may be batch vessels which retain the renderable material until it is finally dry. More preferably they are continuous vessels which accept the moist renderable material at one end and have sufficient residence time so that the material is dried as it is transported through the vessel and discharges continuously at the opposite end of the vessel.

It should be appreciated that by pretreating the renderable material by evaporation and deoiling before cooking it in the cookers, the cooking conditions in the cooker are more easily controlled. The particle size, moisture level, and oil level are made more uniform. The moisture level is less than raw material without pretreatment. Thus, the danger of foaming is reduced, and the cookers can even operate at a partial vacuum. Since a portion of oil is removed before the material is sent to the cookers, oil residency time is reduced.

The water vapor driven from the renderable material in the cookers 4 is preferably collected and passed to the shell side of the evaporator 2 where the released heat of vaporization is reutilized in the step of partially dewatering the slurry. As these vapors pass through the evaporator, they are condensed and eventually discharged, usually as waste water. Generally high pressure steam is used on the jackets of these cookers. Usually the steam used to drive the cookers and the steam condensate discharged from the jacket of the cookers form a closed steam system, with the condensate being recycled to the steamboiler. However, as discussed in System 1, below, some of this excess heat can also be used to drive the evaporator.

One of the benefits of the present invention is the affording of a means to increase the capacity of an existing cooker rendering plant by utilizing the cookers in conjunction with a new evaporator addition. Therefore, there may be any of many combinations of cookers depending on what is already at the plant site. There could be one large continuous cooker or a number of batch cookers, or a stack of continuous cookers in series. There could even be a single large batch cooker.

If the plant has continuous cookers, the flows of solids residue and water vapor from the cookers will already be continuous. The vapors from the cooked material are, according to the invention, collected and directed to the evaporator. The solids flow will remain continuous and will accept the solids discharge from the oil-solids separating device after partial drying in the new evaporator.

If the plant to be retrofitted already has a number of batch cookers, the flow from the cookers of both the solids and the vapors may be intermittent. However, the batch cookers may be operated in parallel. In this case the vapors from the renderable material cooked in the batch cookers are collected in a plenum chamber and directed to the evaporator. If necessary, the vapors can be recompressed either mechanically or by means of a thermal recompressor (steam booster) so as to provide for a more uniform flow of vapor to the evaporator. The solids flow is adapted so that the partially de-oiled, partially dried, renderable material from the oil-solids separating device is collected in a hopper in a continuous manner and discharged intermittently to fill the various batch cookers. In similar fashion the discharge from the batch cookers is collected into a hopper from which it is discharged in a continuous flow to the balance of the product line. In this fashion the rendering system has an overall continous flow in terms of raw material input and finish product output even though portions of the system may be operated batch wise.

Sometimes sterilization of renderable materials is required, which sterilization is done in batch vessels operating at high temperature and pressures. These vessels can also be incorporated into the present invention as one or more of the cookers.

There is a considerable amount of steam savings in operating in this fashion, as compared to providing separate steam sources for the evaporator and cookers. In general terms this saving is equal to the amount of water vapor recovered from the cookers. For a process using a single effect evaporator according to the invention, the steam savings is theoretically sufficient to reduce the steam required to vaporize water from the renderable material by one-half. However, heat is required not only for vaporization, but also to elevate the temperature of the slurry to meet sensible heat and boiling point rise requirements. In addition, any system suffers from some nonuseful heat losses. Therefore, the overall steam savings for all the heat requirements in the system is significantly less than a factor of one-half. But for these other heat requirements and heat losses, a system according to the invention which uses a single effect evaporation without steam regeneration would be most efficiently operated by removing half the water in the evaporator and half in the cookers. But because of these other heat demands additional heat must be added to the vapors from cookers to drive the evaporator or, in the alternative, a lower portion of water is removed from the material in the evaporator than in the cookers. However, it should be appreciated that by using a multi-effect evaporator a greater portion (preferably at least one-half) of the water can be removed in the evaporator without adding heat to the vapors from the cookers.

In addition to hot vapors from the cookers, other vapors from other sources may be used to drive the evaporator. For example, other systems, such as for blood drying and hydrolysis of feathers, may be used as a source of hot vapors for the evaporator.

The following systems are intended to illustrate the operation of rendering processes according to the invention and are not to be considered as limiting the invention to the exact materials or procedures described. In these systems, representative figures for time averaged material flow and system conditions are given; however, it should be understood that the numbers given are not exact figures and have been simplified for the purpose of clarity. These systems are not examples based on actual tests.

SYSTEM 1

Figure 2:
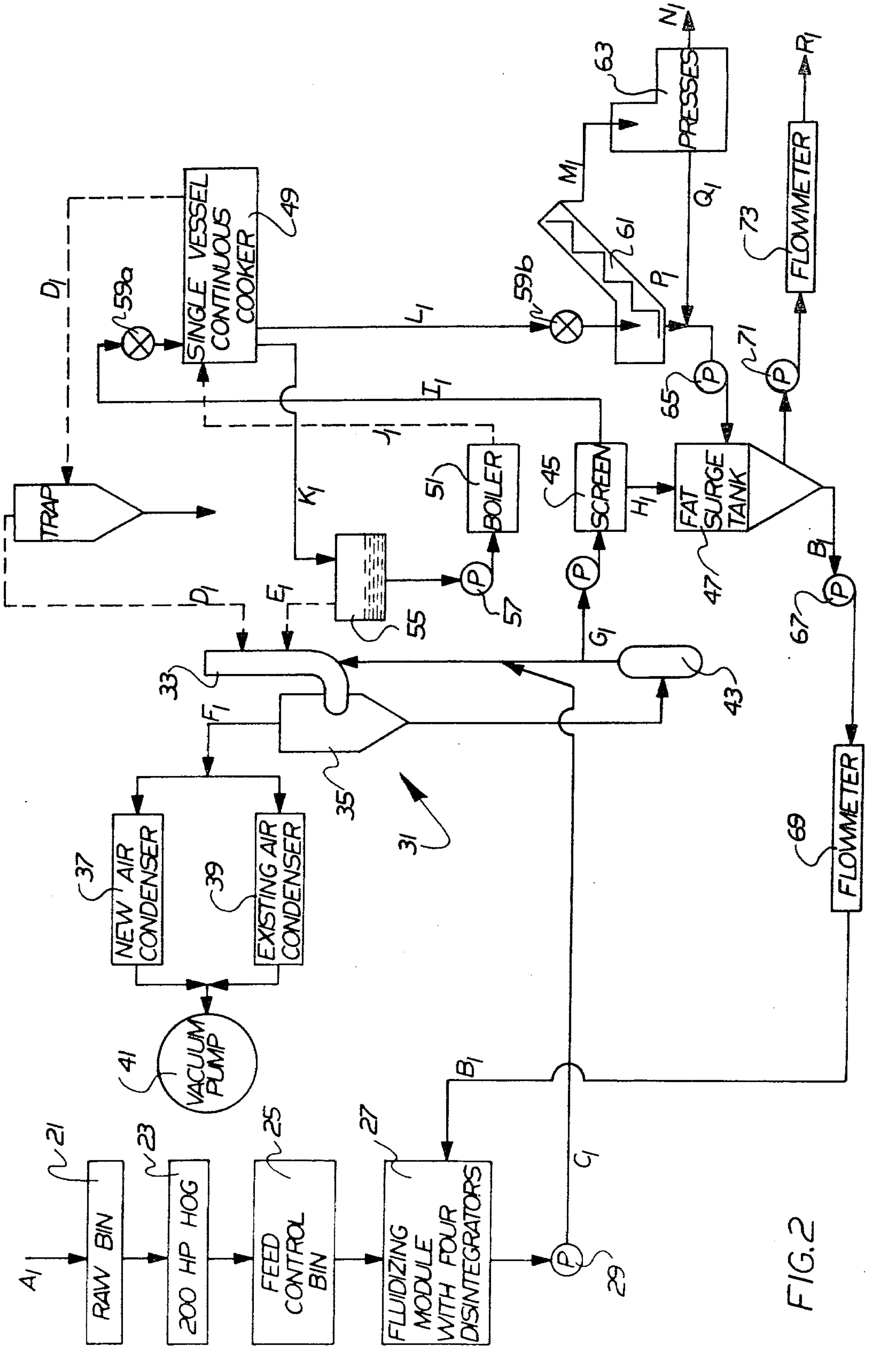
FIG. 2 is a diagram illustrating another embodiment of the invention.

System 1, shown in FIG. 2, illustrates how an existing continuous cooking system can be retrofitted according to the invention. A raw bin 21, an air condenser 39, a vacuum pump 41, a single vessel continuous cooker 49, a boiler 51, a drainer 61, and presses 63 from the pre-existing plant are retained. A new hog 23, a feed control bin 25, a fluidizing module 27, an evaporator 31, a condenser 37, a screen 45, a fat surge tank 47, a flask tank 55, and an entrainment trap 53 are added during retrofitting along with the necessary pumps, meters, lines, ducting, and the like.

For illustrative purposes, a raw material $A_1$ containing about 60% water, 26% solids, and 14% fat, which is typical for beef and pork offal, is considered. Prior to retrofitting, the cooker 49 typically would use about 24.300 pounds/hour of steam to evaporate about 13,500 pounds/hour of vapor from about 23,000 pounds/hour of raw material $A_1$ (there being about 300 pounds/hour of moisture left in the final solids product), and thus typically having a steam ratio (that is, steam divided by evaporator vapor) of about 1.8.

The same amount of steam is used both before and after retrofitting, and it is assumed that the same amount of water is removed by the cooker 49 both before and after retrofitting. A conventional slurry evaporator 31 having a heat exchanger 33 and vapor chamber 35 is added during retrofitting. The evaporator 31 is driven, not by an independent source of steam, but by the vapors $D_1$ from the cooker 49. In addition, a supplemental source of steam is obtained by adding a conventional flash tank 55 to the steam loop after the cooker 49 and before the boiler 51. About an additional 3,000 pounds per hour of steam $E_1$ can be expected from the flask tank 55. A suitable conventional evaporator using about 13,500 pounds/hour of vapors $D_1$ plus about 3,000 pounds/hour of vapors $E_1$ can be expected to evaporate about 12,900 pounds of water from a slurry if the incoming steam is about 205° F., and if the vapor chamber is operated under a vacuum of about 25 inches mercury. Since the retrofitted system can now remove about an additional 12,900 pounds/hour of water, about an additional 22,000 pounds/hour of raw material $A_1$ can be handled (if the final product is to have the same moisture content before and after retrofitting).

On the basis of the foregoing, the expected performance of System 1 has been calculated. Table 1 is a flow chart summarizing these calculations for System 1. The figures in Table 1 have been rounded off for the purpose of this discussion.

After retrofitting, the plant is operated as follows. Raw material $A_1$ is now fed into pre-existing raw bin 21 and then into new prebeaker 23 consisting of a 200 horsepower hog, which replaces a smaller hog from the pre-existing plant. The raw material $A_1$ is fed into the prebreaker 23 at the rate of about 45,000 pounds per hour. The raw material is ground to a particle size of about 1 to 1½ inches. The ground raw material is fed into a new feed control bin 25 and then into a new fluidizing module 27, which includes four disintegrators. This material is mixed with about 57,200 pounds/hour of fat $B_1$. (For simplicity the small amounts of water and solids in fats $B_1$, $H_1$, $P_1Q_1$, and $R_1$ are omitted). The material is finely ground by the distingrators to form a pumpable, oily slurry $C_1$. The result is about 102,200 pounds/hour of slurry $C_1$ containing about 26% water, 11% solids, and 62% fat.

The slurry $C_1$ is pumped by pump 29 to the new recirculating falling film evaporator 31. The slurry is circulated through the heat exchanger 33 by means of a recirculating pump 43. The heat exchanger 33 is jacketed and utilizes water vapors $D_1$ generated in the pre-existing cooker 49 further downstream. The heat exchanger 33 also uses steam $E_1$ from a new flash tank 55. The oily slurry $C_1$ is heated from an incoming temperature of about 120° F. to about 150° F. as it passes through the tubes of the heat exchanger 33, and then it is ejected into the vapor chamber 35 where the separation of water vapor from the slurry occurs under a vacuum of about 25 inches of mercury. The resulting vapors $F_1$ are at a temperature of about 130° F., the saturated temperature of water vapor at 25 inches mercury. The incoming vapors $D_1$ and $E_1$ give up sufficient heat to evaporate about 12,900 pounds of water vapor $F_1$ from the slurry. The vapors $F_1$ are condensed in condensors 37 and 39, one of which is an existing condensor and the other is a condenser added during retrofitting of the plant. A pre-existing vacuum pump 41 maintains the necessary vacuum to operate the evaporator 31.

Partially dried slurry $G_1$ is removed at a rate of about 89,300 pounds per hour and delivered to a new separating screen 45. There is separated about 37,700 pounds/-hour of fat $H_1$, which is sent to fat surge tank 47. It will be noted that raw material $A_1$ is a material with a low fat content and that a screen (rather than something more efficient at removing oil) is the oil separating device, and so only some of the fat $B_1$ to make the slurry is recovered by use of screen 15. There results about 51,600 pounds/hour of partially dried, partially deoiled material $I_1$ which is sent to cooker 49 and contains about 27% water, 23% solids and 50% fat. Valves 59*a*, 59*b* maintain pressure in the cooker 49.

Cooker 49 is a single vessel continuous cooker which continues to use about 24,300 pounds/hour of steam $J_1$ from preexisting boiler 51 to evaporate about 13,500 pounds/hour of vapor $D_1$ the material fet into it. The cooker 49 is retrofitted so the vapors $D_1$ are collected in a new entrainment trap 53 where small amounts (which for simplicity are ignored in this discussion) of oil entrained in the vapors are removed. The vapors $D_1$ are then used to drive evaporator 31. The condensate $K_1$ from steam $J_1$ is sent to a new flash tank 55 where about 3,000 pounds/hour of steam $E_1$ is generated and the remaining condensate is pumped back to boiler 51 through pump 57. The steam $E_1$ is also used to drive evaporator 31.

There results about 38, 100 pounds/hour of dried, partially deoiled residue $L_1$ containing about 2% water, 31% solids and 68% fat. This residue $L_1$ is sent to pre-existing drainer 61. The drainer 61 removes about 17,600 pounds/hour of oil $P_1$ leaving about 20,600 pounds/hour of residue $M_1$ containing about 3% water, 57% solids, and 40% fat. The residue $M_1$ is sent through pre-existing presses 63 which remove about 6,600 pounds/hour of oil $Q_1$ leaving about 14,000 pounds/-hour of solid product $N_1$ containing about 4% water, 84% solids, and 12% fat.

Oil $P_1$ from drainer 61 and oil $Q_1$ from presses 63 are pumped by pump 65 to new fat surge tank 47 which also collects oil $H_1$ from screen 45. From surge tank 47 there is pumped about 57,200 pounds/hour of recycle fat $B_1$ through pump 67 and flowmeter 69 to fluidizing module 27 for use in making the slurry. The remaining about 4,600 pounds/hour of fat $R_1$ is pumped through pump 71 and flowmeter 73 to final treatment as product oil.

The total moisture evaporated is about 26,400 pounds/hour that, is, the sum of vapors $F_1$ and $D_1$. The total steam input is still about 24,300 pounds/hour of steam $J_1$ used in the cooker 49. This results in steam utilization of about 0.92 pounds per pound of water evaporated, which is an improvement over the about 1.8 pounds of steam per pound of water evaporated of the original system.

TABLE 1

Flow Sheet for System 1

| Material | Total Flow (pounds/hour) | Water (pounds/hour) | Fat (pounds/hour) | Solids (pounds/hour) | Temperature (°F.) | Pressure (gauge psi)* or vacuum (inches Hg) |
|---|---|---|---|---|---|---|
| $A_1$ - Raw Material | 45,026 | 27,016 | 6,303 | 11,707 | | |
| $B_1$ - Recycle Fat | 57,167 | | 57,167 | | | |
| $C_1$ - Slurry | 102,193 | 27,016 | 63,470 | 11,707 | 120 | |
| $D_1$ - Cooker Vapors | 13,500 | 13,500 | | | 205 | 4" Hg |
| $E_1$ - Steam Flash | 2,997 | | | | 205 | 4" Hg |
| $F_1$ - Evap. Vapors | 12,904 | 12,904 | | | 130 | 25" Hg |
| $G_1$ - Partially Dry Slurry | 89,289 | 14,112 | 63,470 | 11,707 | 150 | |
| $H_1$ - Screen Oil | 37,651 | | 37,651 | | 150 | |
| $I_1$ - Screened Material | 51,638 | 14,112 | 25,819 | 11,707 | 150 | |
| $J_1$ - Steam | 24,262 | | | | 331 | 90 psi |
| $K_1$ - Condensate | 24,262 | | | | 331 | 90 psi |
| $L_1$ - Cooker Residue | 38,138 | 0. 612 | 25,819 | 11,707 | 150 | |
| $M_1$ - Drained Residue | 20,552 | 612 | 8,233 | 11,707 | | |
| $N_1$ - Pressed Residue | 13,990 | 612 | 1,671 | 11,707 | | |
| $P_1$ - Drained Oil | 17,586 | | 17,586 | | | |
| $Q_1$ - Pressed Oil | 6,562 | | 6,562 | | | |
| $R_1$ - Product Oil | 4,632 | | 4,632 | | | |

*gauge psi + atmospheric pressure = absolute pressure

SYSTEM 2

Figure 3:
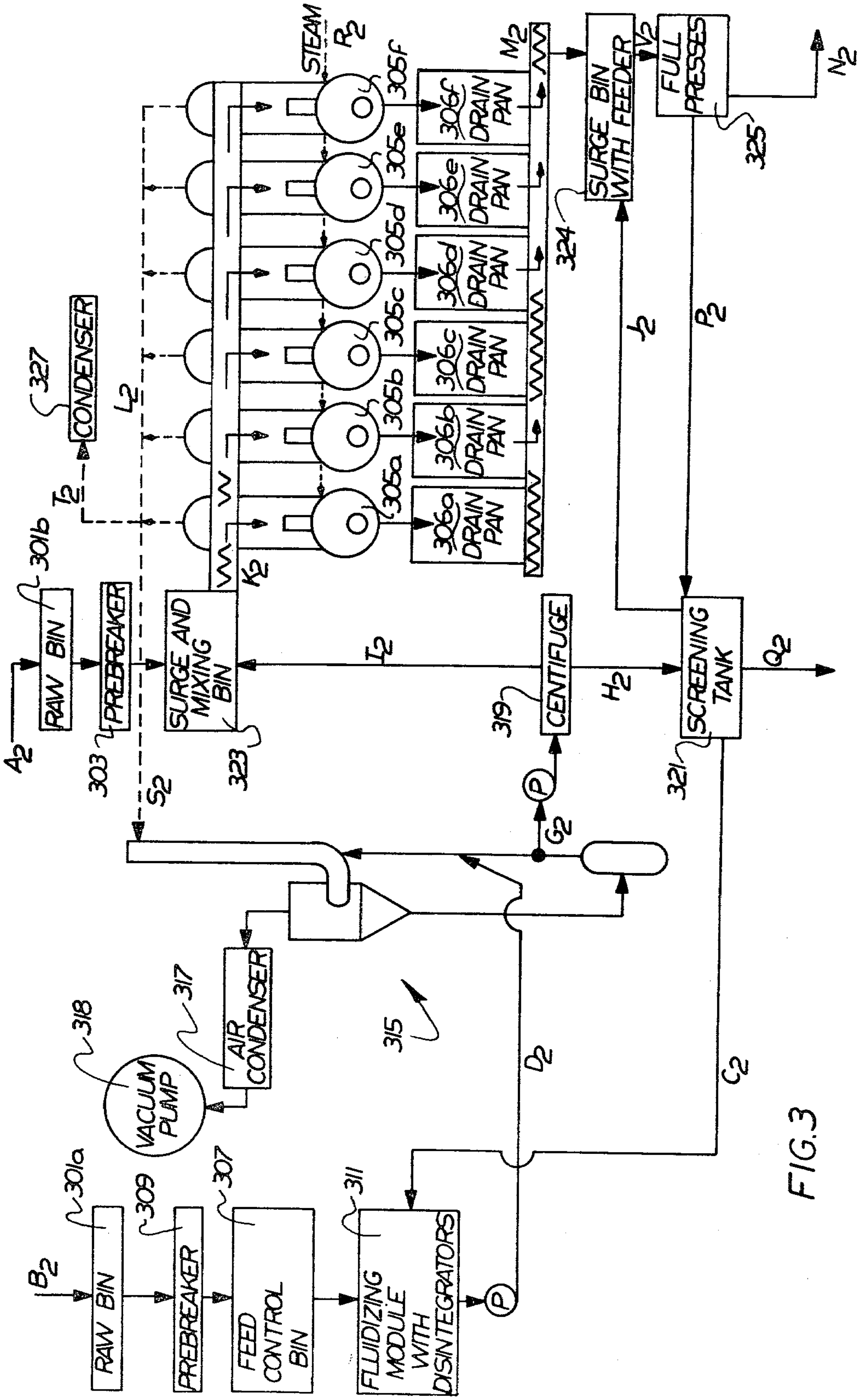
FIG. 3 is a diagram illustrating yet another embodiment of the invention.

System 2, shown in FIG. 3, illustrates how an existing system using a bank of six batch cookers 305*a*, 305*b*, 305*c*, 305*d*, 305*e*, 305*f*, can be retrofitted according to the invention. A raw bin 301*b*, a prebreaker 303, the six batch cookers 305*a–f* and accompanying drain pans 306*a–f*, presses 325, and a condenser 327 are retained from the preexisting plant. An additional raw bin 301*a*, an additional prebreaker 309, a feed control bin 307, a fluidizing module 311, an evaporator 315, an air condenser 317, a centrifuge 319, a screening tank 321, and a surge and mixing bin 323 are added during retrofitting along with the necessary additional pumps, meters, lines, ducting, and the like.

The plant is especially retrofitted according to the invention so as to be able to hand efficiently materials which are expensive to grind. For illustrative purposes, an incoming raw material including both offal and shop fat and bones is considered. It is handled so that the shop fat and bones $A_2$ is sent to raw bin 301*b* and the offal $B_2$ is sent to raw bin 301*a*. Raw bins 301*a* and 301*b* may be two compartments of a single bin. The offal $B_2$ is assumed to contain about 70% water, 12% fat and 18% solids. The shop fat and bones $A_2$ is assumed to contain about 58% water, 14% fat, and 28% solids.

Table 2 is a chart summarizing calculations of the expected performance of System 2 for rendering about 35,900 pounds/hour of shop fat and bones $A_2$ and about 26,000 pounds/hour of offal $B_2$ while using about 44,400 pounds/hour of steam $R_2$. It is assumed that batch cookers 305*a–f* and evaporator 315 are conventionally constructed; however, they are fed and arranged in the system according to the invention. In the following discussion, the figures of Table 2 have been rounded off.

After retorfitting, the plant is operated as follows. The shop fat and bones $A_2$ are fed into the system from raw bin 301*b* at the rate of about 35,900 pounds/hour and sent through a prebreaker 303 and then to a surge and mixing bin 323, where it is collected ad combined with other material before being sent to the cookers 305*a–f*. The offal $B_2$ is subjected to slurry evaporation before being sent to the cookers. It is to be appreciated that the differing treatment of the two kinds of raw material saves the electrical energy which would be required to fine grind the shop fat and bones if all the raw material were handled in a slurry evaporation process.

The offal $B_2$ is fed into the system from raw bin 301*a* at the rate of about 26,000 pounds/hour first into a prebreaker 309, next into a feed control bin 307, and then into a fludizing module 311 with disintegrators where it is fine ground. Slurry $D_2$ is made in the fluidizing module by adding about 21,700 pounds/hour of recycle fat $C_2$. There results about 47,800 pounds/hour of slurry $D_1$ which contains about 38% water, 51% fat, and 10% solids.

The slurry $D_2$ is then sent to evaporator 315 where about 13,200 pounds/hour of water vapor $F_2$ is evaporated from the slurry. The vapors $F_2$ are then condensed in condenser 317. There results about 34,500 pounds/hour of partially dry slurry $G_2$ which contains about 15% water, 71% fat, and 14% solids.

The partially dry slurry $G_2$ is then sent to centrifuge 319 for removal of about 20,200 pounds/hour of impure fat $H_2$ containing about 1% water, 98% fat, and 1% solids which is sent to screening tank 321. (Sometimes it is desirable to add a slurry preheater between the evaporator 315 and the centrifuge 319 because more centrifuges work more efficiently when the incoming slurry is at a temperature of 200° F. or higher.) It should be noted that centrifuge 319 removes about the amount (91%) of the recycle fat $C_2$ used to make the slurry. There results about 14,400 pounds/hour of partially dry, partially de-oiled solids residue $I_2$ which is sent from centrifuge 319 to surge and mixing bin 323 and contains about 35% water, 33% fat, and 33% solids.

Materials $A_2$ and $I_2$ are combined in surge and mixing bin 323 so that a combined flow of material $K_2$ is fed to the cookers 305*a–f* at the rate of about 50,300 pounds/hour (containing about 51% water, 19% fat, and 30% solids).

The cookers 305*a–f* are a bank of six cookers which are fed from surge and mixing bin 323 and which discharge into a set of six interconnected drain pans 306*a*, 306*b*, 306*c*, 306*d*, 306*e*, 306*f* which together form a discharge surge bin. Between the surge bins the flow is by batches and beyond the surge bins the flow is continuous. The cookers 305*a–f* use 44,400 pounds/hour of steam $R_2$ to remove about 24,800 pounds/hour of water vapors $L_2$ resulting in about 25,400 pounds/hour of cooked residue $M_2$ containing about 4% water, 38% fat, and 58% solids.

Screening tank 321 removes about 2,800 pounds/hour of fines $J_2$ containing about 6% water, 50% fat, and 44% solids from the oil sent to it. The cooked residue $M_2$ and fines $J_2$ are added together, fed into a surge bin with feeder 324, and pressed in presses 325 to remove about 10,500 pounds/hour of impure fat $P_2$ containing about 2% water, 87% fat, and 12% solids which is sent to screening tank 321. There results about 17,800 pounds/hour of solids product $N_2$ which contains about 5% water, 11% fat, and 84% solids.

Screening tank 321 removes fines $J_2$ from the fatty products $H_2$ and $P_2$ of screen 319 and presses 325. There is recycled about 21,700 pounds/hour of fat $C_2$ to make the slurry. There remains about 6,100 pounds/hour of product fat $Q_2$.

The cookers 305*a–f* generage about 24,800 pounds/hour of hot vapors $L_2$ which are collected in a header. A portion $S_2$ consisting of about 13,900 pounds/hour from the vapors $L_2$ are used to drive evaporator 315. The remainder $T_2$ of the vapors are disposed of in condersor 327 in order to prevent a build up in the header.

The total water evaporated is about 38,000 pounds/hour which is the sum of vapors $F_2$ plus vapors $L_2$. The only steam used is about 44,400 pounds/hour of steam $R_2$ used in the vat cookers 305*a–f*. This results in a steam utilization of about 1.2 pounds per pound of water evaporated. If both the raw materials $A_2$ and $B_2$ were completely rendered in batch cookers, about 1.8 pounds of steam per pound of water evaporated would be required.

TABLE 2

Flow Sheet for System 2

| Material | Total Flow (pounds/hour) | Water (pounds/hour) | Fat (pounds/hour) | Solids (pounds/hour) | Temperature (°F.) | Pressure (gauge psi)* or vacuum (inches Hg) |
|---|---|---|---|---|---|---|
| $A_2$ - Shop Fat and Bones | 35,880 | 20,778 | 4,921 | 10,181 | | |
| $B_2$ - Offal | 26,039 | 18,228 | 3,124 | 4,687 | | |
| $C_2$ - Recycle Fat | 21,715 | 104 | 21,404 | 207 | 199 | |
| $D_2$ - Raw Slurry | 47,754 | 18,332 | 24,528 | 4,894 | 127 | |
| $F_2$ - Evap. Vapors | 13,228 | 13,228 | | | 133 | 25" Hg |
| $G_2$ - Partially Dry Slurry | 34,526 | 5,104 | 24,528 | 4,894 | 181 | |
| $H_2$ - Centrifuge Fat | 20,154 | 104 | 19,843 | 207 | 181 | |
| $I_2$ - Centrifuge Solids | 14,372 | 5,000 | 4,685 | 4,687 | 181 | |
| $J_2$ - Fines | 2,834 | 157 | 1,418 | 1,259 | 199 | |
| $K_2$ - Cooker Feed | 50,252 | 25,778 | 9,606 | 14,868 | | |
| $L_2$ - Cooker Vapors | 24,815 | 24,815 | | | 230 | Atmospheric Pressure |
| $M_2$ - Cooker Residue | 25,437 | 963 | 9,606 | 14,868 | | |
| $V_2$ - Feed to Presses | 28,271 | 1,120 | 11,024 | 16,127 | | |
| $N_2$ - Pressed Solids | 17,778 | 963 | 1,947 | 14,868 | | |
| $P_2$ - Pressed Oil | 10,493 | 157 | 9,077 | 1,259 | | |
| $Q_2$ - Product Oil | 6,098 | | 6,098 | | | |
| $R_2$ - Steam | 44,426 | | | | 331 | 90 psi |
| $S_2$ - Vapors to Evap. | 13,878 | | | | 230 | Atmospheric |

TABLE 2-continued

| Flow Sheet for System 2 | | | | | | |
|---|---|---|---|---|---|---|
| Material | Total Flow (pounds/ hour) | Water (pounds/ hour) | Fat (pounds/ hour) | Solids (pounds/ hour) | Temperature (°F.) | Pressure (gauge psi)* or vacuum (inches Hg) |
| | | | | | | Pressure |

*gauge psi + atmospheric pressure = absolute pressure

SYSTEM 3

Figure 4:
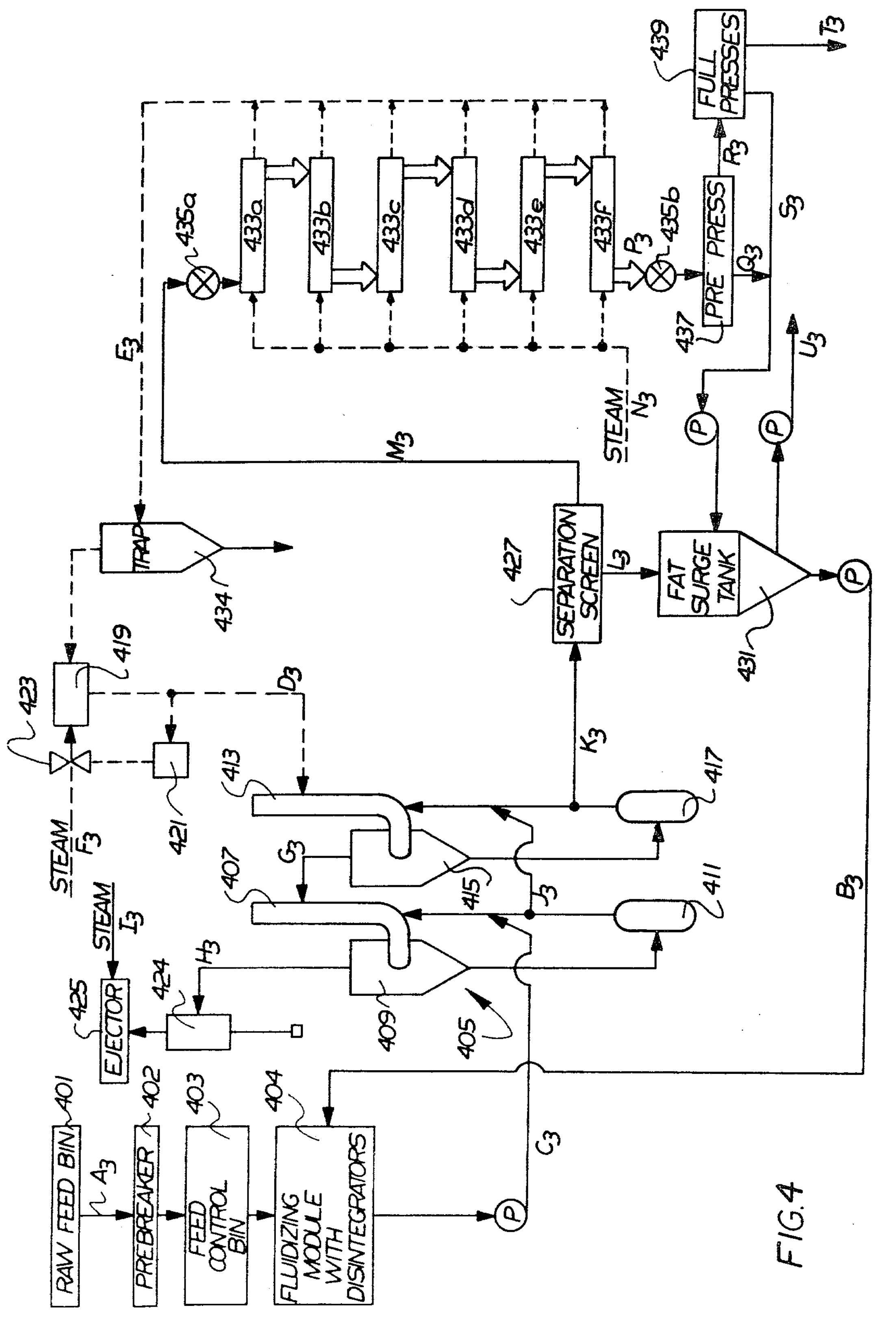
FIG. 4 is a diagram illustrating still another embodiment of the invention.

System 3, shown in FIG. 4, illustrates how an existing plant using a six high bank of continuous cookers 433*a*, 433*b*, 433*c*, 433*d*, 433*e*, 433*f* can be retrofitted acccording to the invention. A raw bin 401, a prebreaker 402, the bank of six cookers 433*a–f*, pre-press 437, and full presses 439 are retained from original plant. A feed control bin 403, a fluidizing module with disintegrators 404, a double effect evaporator 405, a thermocompressor 419, a termperature controller 421, a steam pressure regulator 423, a condenser 424, an ejector 425, a separating screen 427, a fat surge tank 431, and an entrainment trap 434 are added during retrofitting along with the necessary additional pumps, meters, lines, ducting, and the like.

Prior to retrofitting, the plant would typically use about 10,500 pounds/hour of steam to evaporate about 6,000 pounds/hour of water from about 13,300 pounds/hour of raw material comprising packing house material, which is a combination of shop fat, bone, offal, and other renderable materials. This packing house material would typically be about 50% water, 25% fat, and 25% solids. The steam ratio before retrofitting would typically be about 1.75.

By retrofitting the plant according to the invention using a double effect evaporator, plant capacity is increased and the steam ratio reduced. In order to accommodate the double effect evaporator, the hot vapors $E_3$ from the cookers 433*e–f* are boasted by a steam thermocompresser 419. In addition, System 3 shows the preferred arrangement of using an ejector 425 instead of a vacuum pump to draw vacuum.

Table 3 is a chart summarizing calculations of the expected performance of System 3 for rendering about 37,000 pounds/hour of packing house material. It is assumed that cookers 433*a–f* and evaporator 405 are conventionally constructed; however, they are fed and arranged in the system according to the invention. In the following discussion, the figures of Table 3 have been rounded off.

The raw feed $A_3$ containing about 50% water, 25% fat, and 25% solids is fed into the system from the raw bin 401 at a rate of about 37,000 pounds/hour. The raw feed $A_3$ is coarsely ground in prebreaker 402 and then passes to the feed control bin 403. Then it is mixed with about 41,600 pounds/hour recycle fat $B_3$ and fine ground into a slurry in the fluidizing module 404. The resulting slurry $C_3$ containing about 24% water, 65% fat and 12% solids is fed to a double effect evaporator 405 at a rate of about 78,600 pounds/hour. For simplicity in these calculations the fat is assumed to contain no moisture or solids. Actually it would carry trace amounts of each.

The evaporator 405 comprises a first stage heat exchanger 407, a first stage vapor chamber 409, and a first stage recirculation pump 411. Pump 411 recirculates the slurry at high flow, approximately 1,500 gallons/minute, through the heat exchanger and vapor chamber to improve the efficiency of evaporation. The evaporator 405 also comprises a second stage heat exchanger 413, a second stage vapor chamber 415, and a second stage recirculation pump 417.

The second stage heat exchanger 413 receives hot vapors $D_3$ at a temperature of about 212° F. and at about atmospheric pressure. The hot vapors $D_3$ are a combination of cooker vapors $E_3$ and booster steam $F_3$ which is mixed with the cooker vapors through a thermocompressor 419 to elevate the latter's temperature and pressure. The thermocompressor is controlled by a temperature controller 421 actuating a steam pressure regulator 423. The flow of cooker vapors $E_3$ of about 6,000 pounds/hour at about 205° F. is augmented by about 1,800 pounds/hour of booster steam $F_3$ to give about 7,800 pounds/hour of vapors $D_3$ at about 212° F. to the evaporator.

Water vapors $G_3$ at a temperature of about 170° F. and a flow of about 6,200 pounds/hour are released from the slurry in the second stage vapor chamber 415. These vapors $G_3$ pass to the first stage heat exchanger 407, condense and boil more water vapor $H_3$ from the incoming slurry $C_3$. Vapor $H_3$ is collected in the first stage vapor chamber 409 at a flow of about 5,700 pounds/hour and a temperature of about 123° F., and are condensed in a condenser 424 operated at high vacuum maintained by an ejector 425 which draws about 1,800 pounds/hour steam $I_3$. This steam $I_3$ will be included in the steam ratio showing efficiency of evaporation for System 3.

The slurry $C_3$ is partially rendered in the first stage of the evaporator where about 5,700 pounds/hour of moisture $H_3$ is removed. The resulting interstage slurry $J_3$ contains about 18% water, 70% fat and 13% solids, and enters the second stage heat exchanger 413 at a flow rate of about 73,000 pounds/hour, where additional moisture $G_3$ is removed.

The partially dry slurry $K_3$ leaving the evaporator contains about 10% water, 76% fat and 14% solids and is passed through a separation screen 427 where about 21,300 pounds/hour of fat $L_3$ is drained from the slurry (a centrifuge would remove more fat). Again the fat is assumed to be free of moisture and solids to simplify the calculations. The fat $L_3$ passes to the fat surge tank 431 and the solids $M_3$ from the separation screen pass to a six pass continuous cooker 433*a*, 433*b*, 433*c*, 433*d*, 433*e*, 433*f*. The partially dry, partially de-oiled solids $M_3$ from the separation screen flow at a rate of about 45,500 pounds/hour and contain about 15% water, 65% fat and 20% solids.

The six pass continuous cooker 433*a–f* uses about 10,500 pounds/hour steam $N_3$ to remove about 6,000 pounds/hour of moisture $E_3$. This moisture $E_3$ passes through trap 434 which removes entrainment and is then mixed with booster steam $F_3$ to drive the evaporator 405. The cooker residue $P_3$ flows at a rate of about 39,500 pounds/hour and contains about 2% water, 75% fat and 23% solids. The cookers are sealed at the inlet and the outlet with valves 435*a* and 435*b* which serve as air locks to prevent excessive air from mixing in with the vapors within the cooker.

Residue $P_3$ then is collected in a surge bin with feeder (not shown), and next passes through a prepress 437 which removes additional fat $Q_3$ at the rate of about 26,200 pounds/hour. The solids $R_3$ then pass through a full press 439 which removes the balance of the recoverable fat $S_3$. This fat $S_3$ along with the prepress fat $Q_3$ is pumped to the fat surge tank 431. The final press cake $T_3$ contains about 6% water, 10% fat and 84% solids and is produced at a rate of about 11,000 pounds/hour.

The recycle fat $B_3$ is pumped from the fat surge tank 431 at a flow of about 41,600 pounds/hour. The raw feed $A_3$ contained about 9,300 pounds/hour fat and the press cake $T_3$ contains about 1,100 pounds/hour fat. The difference of about 8,200 pounds, which is product fat $U_3$, is pumped from fat surge tank 431 to fat storage.

After retrofitting according to the invention, the new capacity would be about 37,000 pounds/hour of raw material $A_3$, from which about 17,800 pounds/hour ($H_3$ plus $G_3$ plus $E_3$) of water is evaporated using about 14,100 pounds/hour steam ($N_3+F_3+I_3$), thereby giving a steam ratio of about 0.8.

In the drying of corn germ this is not true; some tube dryers can be sealed, others cannot. One type of tube dryer that can be sealed is the Anderson IBEC 72 Tube Dryer. The tube dryers are of a type suitable for operation under a slight vacuum of around 4 inches Hg. For this size wet corn germ plant, twenty-one such dryers would be required arranged in seven stacks of three each. Each stack would be in parallel with the others, and the three dryers within each stack would be in series. (It would be unusual to select that many dryers for a new modern plant because there are larger capacity tube dryers on the market, but these cannot be sealed for retrofitting.) Such a bank of 21 dryers operating at a capacity of about 16,100 pounds/hour of corn germ at about 65% moisture drying to about 2.7% residual moisture would be expected to require about 17,800 pounds/hour steam, thereby giving a steam ratio of about 1.7.

Figure 5:
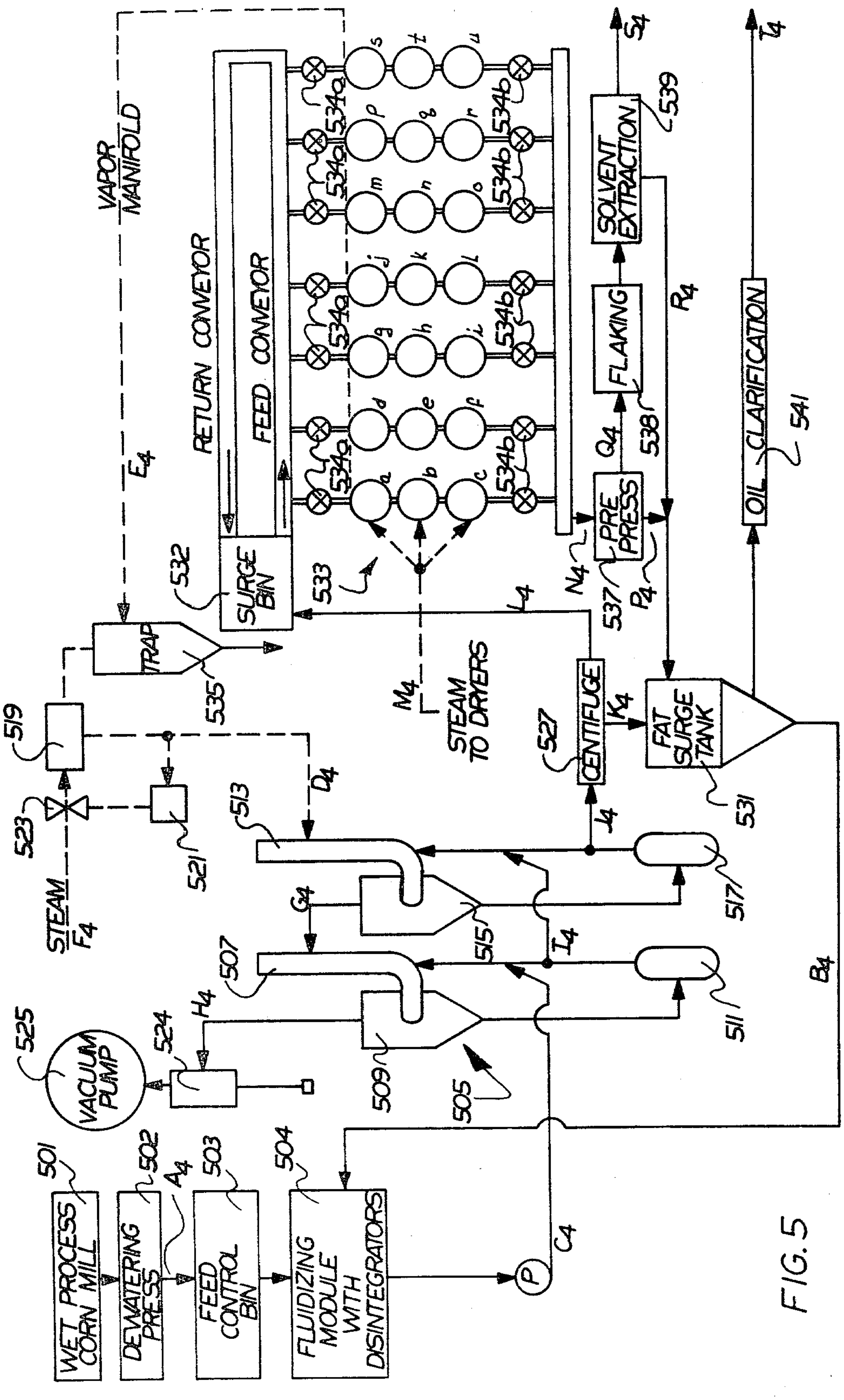
FIG. 5 is a diagram illustrating another embodiment of the invention.

System 4, shown in FIG. 5, illustrates how such a plant using 21 Anderson IBEC 72 Tube Dryers 533*a–u* as rendering cookers can be retrofitted according to the invention. A double effect evaporator 505 and other necessary equipment is added during retrofitting.

Table 4 is a chart summarizing calculations of the expected performance of System 4 for handling 50,000 pounds/hour of raw germ. It is assumed that the dryers

TABLE 3

Flow Sheet for System 3

| Material | Total Flow (pounds/hour) | Water (pounds/hour) | Fat (pounds/hour) | Solids (pounds/hour) | Temperature (°F.) | Pressure (gauge psi)* or vacuum (inches Hg) |
|---|---|---|---|---|---|---|
| $A_3$ - Raw Feed | 37,000 | 18,500 | 9,250 | 9,250 | 80 | |
| $B_3$ - Recycle Fat | 41,625 | | 41,625 | | 180 | |
| $C_3$ - Slurry | 78,625 | 18,500 | 50,875 | 9,250 | 135 | |
| $D_3$ - Vapors to evap. | 7,800 | | | | 212 | Atmospheric Pressure |
| $E_3$ - Cooker Vapors | 6,000 | 6,000 | | | 205 | 4" Hg |
| $F_3$ - Booster Steam | 1,800 | | | | 324 | 80 psi |
| $G_3$ - Second Stage Vapors | 6,170 | 6,170 | | | 170 | 17.7" Hg |
| $H_3$ - First Stage Vapors | 5,670 | 5,670 | | | 123 | 26" Hg |
| $I_3$ - Ejector Steam | 1,750 | | | | 324 | 80 psi |
| $J_3$ - Interstage Slurry | 72,955 | 12,830 | 50,875 | 9,250 | 140 | |
| $K_3$ - Partially Dry Slurry | 66,785 | 6,660 | 50,875 | 9,250 | 180 | |
| $L_3$ - Screen Oil | 21,328 | | 21,328 | | 180 | |
| $M_3$ - Screen Solids | 45,457 | 6,660 | 29,547 | 9,250 | 180 | |
| $N_3$ - Steam To Cooker | 10,500 | | | | 331 | 90 psi |
| $P_3$ - Cooker Residue | 39,457 | 660 | 29,547 | 9,250 | 280 | |
| $Q_3$ - Prepress Fat | 26,244 | | 26,244 | | 280 | |
| $R_3$ - Prepress Cake | 13,213 | 660 | 3,303 | 9,250 | 285 | |
| $S_3$ - Full Press Fat | 2,203 | | 2,203 | | 285 | |
| $T_3$ - Full Press Cake | 11,010 | 660 | 1,100 | 9,250 | 290 | |
| $U_3$ - Product Fat | 8,150 | | 8,150 | | 200 | |

*gauge psi + atmospheric pressure = absolute pressure

SYSTEM 4

Wet process corn germ is a well known by-product of the wet milling of corn, during which the corn germ is recovered from a watery solution of steeped and shredded corn kernels. It is pressed to about 65% moisture and is typically dried in one step to about 3% residual moisture, generally in a tube dryer. The dried corn germ typically contains approximately 50% oil and is typically prepressed to around 25% oil, then flaked and solvent extracted to about 1% residual oil.

For the purpose of this illustration, the retrofitting of a wet process mill producing about 16,100 pounds/hour of wet germ at about 65% moisture is considered. Most of the cookers used in the animal fat rendering industry can be sealed for slight vacuum or pressure operation.

533 and the evaporator 505 are conventionally constructed; however, they are fed and arranged in the system according to the invention. In the following discussion, the figures of Table 4 have been rounded off.

The raw corn is fed into the system from the wet mill 501 and is pressed in a dewatering press 502 to form a raw corn germ $A_4$ containing about 65% water, 18% fat, and 18% solids, is then passed to a feed control bin 503. The raw germ $A_4$ is fed into fluidizing module 504 where it is mixed with about 39,400 pounds/hour recycle oil $B_4$ and coursely ground into a slurry. The resulting slurry $C_4$ contains about 36% water, 54% oil and 10% solids and is fed to a double effect evaporator 505 at a rate of about 89,400 pounds/hour. For simplicity in these calculations the oil is assumed to contain no moisture or solids. Actually it would carry trace amounts of each.

The evaporator 505 comprises a first stage heat exchanger 507 and first stage vapor chamber 509 and first stage recirculation pump 511. The pump 511 recirculates the slurry at high flow, approximately 1,500 gallons/minute, through the heat exchanger and vapor chamber to improve the efficiency of evaporation. The evaporator also comprises a second stage heat exchanger 513 and second stage vapor chamber 515 and second stage recirculation pump 517.

The second stage heat exchanger 513 receives hot vapors $D_4$ at a temperature of about 212° F. and at about atmospheric pressure. The hot vapors $D_4$ are a combination of dryer vapors $E_4$ and booster steam $F_4$ which is mixed with the dryer vapors through a thermocompressor 519 to elevate the latter's temperature and pressure. The thermocompressor is controlled by a temperature controller 521 actuating a steam pressure regulator 523. The flow of dryer vapors $E_4$ of about 11,000 pounds/-hour at about 205° F. is augmented by about 3,300 pounds/hour of booster steam $F_4$ at about 324° F. to give about 14,200 pounds/hour vapors $D_4$ at about 212° F. to the evaporator 505.

Water vapors $G_4$ at a temperature of about 170° F. and a flow of about 10,900 pounds/hour are released from interstage slurry $I_4$ in the second stage vapor chamber 515. Vapors $G_4$ pass to the first stage heat exchanger 507, condense and boil more water vapor $H_4$ from the incoming slurry $C_3$. Vapor $H_4$ is collected in the first stage vapor chamber 509 at a flow of about 10,000 pounds/hour and a temperature of about 123° F. Vapors $H_4$ are condensed in a condenser 524 operated at high vacuum maintained by a vacuum pump 525 which does not require steam.

The slurry $C_4$ is partially rendered in the first stage of the evaporator where about 10,000 pounds/hour of moisture $H_4$ is removed. The resulting interstage slurry $I_4$ contains about 28% water, 61% oil and 11% solids, and enters the second stage heat exchanger 513 at a flow rate of about 79,400 pounds/hour, where additional moisture $G_4$ is removed.

The partially dry slurry $J_4$ leaves the evaporator at a rate of about 68,500 pounds/hour and contains about 17% water, 70% oil and 13% solids. It is passed through a centrifuge 527 where about 34,600 pounds/hour of oil $K_4$ is removed from the slurry. Again the oil is assumed to be free of moisture and solids to simplify the calculations. It should be noted that centrifuge 527 removes about the amount (88%) of the recycle oil $B_4$ used to make the slurry. The oil passes to the fat surge tank 531 and the solids $L_4$ from the centrifuge pass to a surge bin 532.

Runaround conveyors are used to provide for a means of drawing a uniform feed from the surge bin 532 to each stack of dryers. Each stack of dryers is sealed with valves at the inlet 534*a* and outlet 534*b* to serve as air locks preventing excessive air from leaking in to mix with the dryer vapors. The partially dry, partially de-oiled solids $L_4$ from the centrifuge flow at a rate of about 33,900 pounds/hour containing about 34% water, 40% fat, and 26% solids are fed into the dryers.

The bank of tube dryers 533*a–u* uses about 17,800 pounds/hour steam $M_4$ to remove about 11,000 pounds/hour moisture $E_4$ from the solids residue $L_4$. This moisture $E_4$ passes through trap 534 which removes entrainment and is mixed with booster steam $F_4$ to drive the evaporator 505.

The dryer residue $N_4$ flows at a rate of about 22,900 pounds/hour and contains about 3% water, 60% oil and 38% solids. It then passes via a surge bin with feeder (not shown) through a prepress 537 which removes a portion of the oil $P_4$ at the rate of about 10,400 pounds/-hour. The pressed solids $Q_4$ then pass through a flaking step 538 and then through a solvent extraction plant 539 which removes the balance of the recoverable oil $R_4$ at the rate of about 3,000 pounds/hour. This oil $R_4$ along with the prepress oil $P_4$ is pumped to the fat surge tank 531. The final extracted meal $S_4$ contains about 7% water, 1% oil and 92% solids and is produced at a rate of about 9,500 pounds/hour.

The recycle oil $B_4$ is pumped from the fat surge tank 531 at a flow of about 39,400 pounds/hour. The raw germ $A_4$ contains about 8,800 pounds/hour oil and the extracted meal $S_4$ contains about 100 pounds/hour oil. The difference of about 8,700 pounds, which is product oil $T_4$, is pumped from fat surge tank 531 to oil clarification 541 and thence to oil storage.

The bank of tube dryers can direct dry about 16,100 pounds/hour of raw wet corn germ evaporating about 10,300 pounds/hour of water using about 17,800 pounds/hour of steam for a steam ratio of about 1.7. After retrofitting according to the invention, the system is expected to remove about 31,900 pounds/hour of water (the sum of $E_4$ plus $G_4$ plus $H_4$) using about 21,100 pounds/hour of steam (the sum of $M_4$ and $F_4$), thereby giving a steam ratio of about 0.7.

TABLE 4

Flow Sheet for System 4

| Material | Total Flow (pounds/hour) | Water (pounds/hour) | Fat (pounds/hour) | Solids (pounds/hour) | Temperature (°F.) | Pressure (gauge psi)* or vacuum (inches Hg) |
|---|---|---|---|---|---|---|
| $A_4$ - Raw Germ | 50,000 | 32,500 | 8,750 | 8,750 | 120 | |
| $B_4$ - Recycle Oil | 39,375 | | 39,375 | | 180 | |
| $C_4$ - Raw Slurry | 89,375 | 32,500 | 48,125 | 8,750 | 160 | |
| $D_4$ - Vapor to Evap. | 14,237 | | | | 212 | Atmospheric Pressure |
| $E_4$ - Vapors From Dryers | 10,952 | 10,952 | | | 205 | 4" Hg |
| $F_4$ - Booster Steam | 3,285 | | | | 324 | 80 psi |
| $G_4$ - Second Stage Vapors | 10,901 | 10,901 | | | 170 | 17.7" Hg |
| $H_4$ - First Stage Vapors | 10,022 | 10,022 | | | 123 | 26" Hg |
| $I_4$ - Interstage Slurry | 79,353 | 22,478 | 48,125 | 8,750 | 140 | |
| $J_4$ - Partially Dry Slurry | 68,452 | 11,577 | 48,125 | 8,750 | 180 | |
| $K_4$ - Centrifuge Oil | 34,574 | | 34,574 | | 180 | |
| $L_4$ - Centrifuge Solids | 33,878 | 11,577 | 13,551 | 8,750 | 180 | |
| $M_4$ - Steam to Dryers | 17,813 | | | | 331 | 90 psi |
| $N_4$ - Dryer Residue | 22,926 | 625 | 13,551 | 8,750 | 280 | |

TABLE 4-continued

Flow Sheet for System 4

| Material | Total Flow (pounds/hour) | Water (pounds/hour) | Fat (pounds/hour) | Solids (pounds/hour) | Temperature (°F.) | Pressure (gauge psi)* or vacuum (inches Hg) |
|---|---|---|---|---|---|---|
| $P_4$ - Prepressed Fat | 10,426 | | 10,426 | | 280 | |
| $Q_4$ - Prepressed Cake | 12,500 | 625 | 3,125 | 8,750 | 285 | |
| $R_4$ - Solvent Extracted Fat | 3,030 | | 3,030 | | | |
| $S_4$ - Solvent Extracted Meal | 9,470 | 625 | 95 | 8,750 | | |
| $T_4$ - Product Oil | 8,655 | | 8,655 | | | |

*gauge psi + atmospheric pressure = absolute pressure

The Objects of the invention are achieved by the rendering process disclosed herein. A process using a slurry evaporator to pretreat material before cooking in a cooker is disclosed. The moisture content of the renderable material is reduced before it is sent to the cookers, and so the danger of foaming is reduced. The particle size, oil content and moisture content of the renderable material is rendered more uniform before it is sent to the cookers, and so cooking conditions in the cookers are more easily controlled. A significant portion of the oil is removed in the deoiling step between the evaporator and the cookers, and so average oil retention time at high temperature is reduced. In addition, this deoiling step reduces the recycling of fines. The heat of vaporization in the cookers is reused to drive the evaporator, and so energy efficiency is increased. Existing cookers may be used, thereby giving the option of improving existing systems at minimum cost.

The invention has been described in detail with particular emphasis on preferred embodiments thereof, but it will be understood that variations and modifications within the spirit and scope of the invention may occur to those skilled in the art to which the invention pertains.

What we claim is:

1. Apparatus for rendering organic raw material comprising oil, water and solids, said apparatus comprising:
   - means for making a slurry by reducing the particle size of said organic raw material and adding at least enough additional oil to make a pumpable slurry;
   - means for evaporating a portion of said water by heating said slurry under a partial vacuum to form a partially dewatered slurry;
   - means for removing a portion of said oil from said partially dewatered slurry to form a hydrous solids residue having a lower water content than said raw material; and
   - means for cooking said hydrous solids residue to remove substantially all the remaining water to form a dewatered solids residue.

2. The invention of claim 1, further comprising:
   - means for removing substantially all the remaining oil from said dewatered solids residue to form a dewatered, deoiled solids residue.

3. The invention according to claim 1, wherein said means for cooking of said hydrous solids residue produces hot vapors, and said means for evaporating water from said slurry comprises means for heating said slurry with said hot vapors.

4. The invention of claim 1, wherein said means for removing a portion of said oil from said partially dewatered slurry comprises means for removing at least the amount of oil drainable from said partially dewatered slurry.

5. The invention of claim 1, wherein said means for removing oil from said partially dewatered slurry to form said hydrous solids residue has capacity sufficient to remove at least about the amount of oil added to said raw material to make said slurry, and further comprising means for adding said oil removed from said partially dewatered slurry to said raw material to make said slurry.

6. The invention of claims 1, 2, 3, 4, or 5, wherein said means for evaporating water from said slurry comprises means for heating said slurry with excess heat from a system for treating materials other than said organic raw material being rendered.

7. The invention of claims 1, 2, 3, 4, or 5, wherein said means for cooking said solids residue comprises means for cooking said hydrous solids residue in a steam jacketed vessel, and said means for evaporating water from said slurry comprises means for heating said slurry with excess steam from said steam jacket.

8. The invention of claims 1, 2, 3, 4, or 5, wherein said means for evaporating water from said slurry comprises a multiple effect evaporator system.

9. The invention of claims 1, 2, 3, 4, or 5, wherein said means for cooking said hydrous solids residue comprises a plurality of continuous cookers operated in series.

10. The invention of claims 1, 2, 3, 4, or 5, wherein said means for cooking said hydrous solids residue comprises a plurality of batch cookers operated in parallel.

11. The invention of claims 1, 2, 3, 4, or 5, wherein said means for cooking said hydrous solids residue comprises means for cooking said hydrous solids residue under more than atmospheric pressure at a temperature sufficient to form a sterilized, dewatered solids residue.

12. The invention of claims 1, 2, 3, 4, or 5, wherein said means for cooking said hydrous solids residue comprises means for cooking renderable material other than said hydrous solids residue with said hydrous solids residue.

13. The invention of claims 1, 2, 3, 4, or 5, further comprising:
    - means for separating expensive-to-grind portions of said raw material from the other portions of said raw material and making said slurry from said other portions.

14. The invention of claims 1, 2, 3, 4, or 5, further comprising:
    - means for separating portions of said raw material which are troublesome to render in an evaporator from the other portions of said raw material and making said slurry from said other portions.

15. The invention of claim 13, wherein said means for cooking said hydrous solids residue comprises means for cooking said separated materials with said hydrous solids residue to form a dewatered solids residue.

16. The invention of claim 14, wherein said means for cooking said hydrous solids residue comprises means for cooking said separated materials with said hydrous solids residue to form a dewatered solids residue.

* * * * *